(12) United States Patent
Moriyama et al.

(10) Patent No.: US 7,405,839 B2
(45) Date of Patent: Jul. 29, 2008

(54) PRINTING APPARATUS PRINTER DRIVER, AND BUFFER MANAGEMENT METHOD

(75) Inventors: Jiro Moriyama, Kanagawa (JP); Hidehiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 916 days.

(21) Appl. No.: 10/413,374

(22) Filed: Apr. 15, 2003

(65) Prior Publication Data
US 2003/0193675 A1 Oct. 16, 2003

(30) Foreign Application Priority Data
Apr. 15, 2002 (JP) ............................. 2002-112615

(51) Int. Cl.
*G06F 15/00* (2006.01)
*G06K 1/00* (2006.01)
(52) U.S. Cl. ..................................... 358/1.16; 709/215
(58) Field of Classification Search ............... 358/1.15, 358/1.14, 1.16; 709/203, 215; 710/15, 22, 710/35; 347/12, 5, 56
See application file for complete search history.

(56) References Cited

U.S. PATENT DOCUMENTS

| | | | | |
|---|---|---|---|---|
| 4,723,129 A | * | 2/1988 | Endo et al. | 347/56 |
| 5,382,968 A | | 1/1995 | Endoh | 347/112 |
| 5,671,445 A | | 9/1997 | Gluyas et al. | 710/53 |
| 5,816,714 A | * | 10/1998 | Hori | 400/61 |
| 5,825,993 A | * | 10/1998 | Shimura et al. | 358/1.16 |
| 5,870,535 A | * | 2/1999 | Duffin et al. | 358/1.16 |
| 5,920,681 A | | 7/1999 | Hori | 395/105 |
| 5,937,152 A | * | 8/1999 | Oda et al. | 358/1.16 |
| 6,097,499 A | * | 8/2000 | Casey et al. | 358/1.16 |
| 6,142,604 A | | 11/2000 | Kanda et al. | 347/41 |
| 6,313,922 B1 | | 11/2001 | Jackson | 358/1.16 |
| 6,918,646 B2 | * | 7/2005 | Kanda et al. | 347/19 |
| 2002/0063750 A1 | | 5/2002 | Kanda et al. | 347/41 |
| 2002/0070997 A1 | | 6/2002 | Nakagawa et al. | 347/37 |
| 2002/0075340 A1 | | 6/2002 | Moriyama | 347/14 |

FOREIGN PATENT DOCUMENTS

| | | |
|---|---|---|
| CN | 1199197 A | 11/1998 |
| CN | 1221153 A | 6/1999 |

(Continued)

*Primary Examiner*—Thomas D Lee
(74) *Attorney, Agent, or Firm*—Fitzpatrick, Cella, Harper & Scinto

(57) ABSTRACT

In a printing apparatus which performs printing by scanning a printhead having printing elements arrayed in a predetermined direction on a printing medium in a direction crossing to the array direction on the basis of information transmitted from a host apparatus, stores print data transmitted from the host apparatus, and has a buffer smaller in capacity than a print data amount printed on the printing medium by one scanning of the printhead, the buffer is divided into a plurality of blocks corresponding to rectangular regions printed by scanning. The use order of the blocks is so managed as to circularly store print data in the blocks along with the progress of printing. When print data representing non-driving of the printing elements successively exist in a predetermined amount, the predetermined amount of print data is represented by specific control data without storing the predetermined amount of print data in the blocks. High-speed, high-quality printing can be achieved with a low-cost arrangement having a memory smaller in capacity than a data amount printed by one main scanning.

16 Claims, 8 Drawing Sheets

FOREIGN PATENT DOCUMENTS

| | | |
|---|---|---|
| EP | 01021528 | 1/1989 |
| EP | 0 782 095 | 7/1997 |
| EP | 0 887 763 A2 | 12/1998 |
| EP | 0 917 093 A2 | 5/1999 |
| JP | 58-146929 | 9/1983 |
| JP | 9-39306 | 2/1997 |
| JP | 9-48154 | 2/1997 |
| JP | 11-259248 | 9/1999 |
| JP | 2000127522 | 5/2000 |
| JP | 2000127522 A * | 5/2000 |
| WO | WO 97/08622 | 3/1997 |

* cited by examiner

PRINTING APPARATUS PRINTER DRIVER, AND BUFFER MANAGEMENT METHOD

FIELD OF THE INVENTION

The present invention relates to a printing apparatus, printer driver, and buffer management method, particularly, to a buffer management method for a printing apparatus which performs printing by scanning a printhead having printing elements arrayed in a predetermined direction on a printing medium in a direction crossing to the array direction on the basis of information transmitted from a host apparatus and, more particularly, to a printing apparatus and printing method capable of high-speed, high-quality printing while reducing the capacity of a storage means (memory) arranged in the printing apparatus and reducing the cost of the printing apparatus.

BACKGROUND OF THE INVENTION

At present, there are known various printing methods used to print characters, images, information, and the like on printing media. An inkjet printing method has widely been used in printing apparatuses, copying machines, and the like because of low noise, low apparatus cost, low running cost, and compact apparatus can be facilitated.

A conventional serial inkjet printing apparatus prints one page by alternately repeating main scanning by a printhead and sub-scanning of conveying a printing medium. A memory having a memory capacity enough to store all data to be printed by one main scanning at a main scanning printing width printable by a printing apparatus is used as a print buffer for storing data to be printed by the printhead. After all data to be printed by one main scanning are stored in the print buffer, main scanning of the printhead starts to perform printing.

Recently, in order to achieve color printing, higher image quality, higher resolution, and higher-speed printing, the number of printheads and the number of printing elements (ink discharge elements) arranged in each printhead tend to increase.

A larger number of printheads and a larger number of printing elements arranged in each printhead increase the data amount printed by one main scanning. The memory capacity necessary for the print buffer increases, resulting in a high apparatus cost.

To prevent this, Japanese Patent Laid-Open No. 58-146929 discloses a technique of managing an address at which print data is stored, efficiently using a memory, and performing printing with a memory capacity smaller than a data amount printed by one main scanning.

This reference, however, does not disclose processing of null data as data representing no printing. The use of the memory is not optimally efficient. Also, this reference does not disclose printing operation when data transfer to the memory does not in time for printing operation.

Japanese Patent Laid-Open No. 11-259248, which corresponds to U.S. Pat. No. 6,097,499 discloses a technique of starting main scanning before the completion of receiving data of one main scanning.

The technique disclosed in this reference assumes that print data is received before actual printing by main scanning. A host apparatus such as a computer which transfers print data to a printing apparatus must continuously execute printing without any interrupt or interference of data transfer.

Windows System® which is widely used as the OS of recent computers is a general-purpose multitask system. In practice, the computer hardly performs only data transfer during printing. The program of a printer driver installed in a computer allows continuously executing printing without any interrupt or interference of data transfer. In this case, the merit of the multitask system is lost. This reference does not disclose processing of null data as data representing no printing. The use of the memory is not optimally efficient.

These problems are not unique to an inkjet printing apparatus but common to all serial printing apparatuses.

SUMMARY OF THE INVENTION

It is an object of the present invention to provide a printing apparatus capable of high-speed, high-quality printing with a low-cost equipment including a memory smaller in capacity than a data amount printed by one main scanning.

It is another object of the present invention to provide a printer driver for the printing apparatus capable of high-speed, high-quality printing with a low-cost equipment including a memory smaller in capacity than a data amount printed by one main scanning.

It is still another object of the present invention to provide a buffer management method for the printing apparatus capable of high-speed, high-quality printing with a low-cost equipment including a memory smaller in capacity than a data amount printed by one main scanning.

To achieve one object, a printing apparatus according to one aspect of the present invention is a printing apparatus which performs printing on a printing medium on the basis of print data transmitted from a host apparatus by using a printhead in which a plurality of printing elements are arrayed in a predetermined direction, comprising: scanning means for scanning the printhead in a main scanning direction crossing to the predetermined direction; a buffer which stores the print data transmitted from the host apparatus in order to transfer the print data to the printhead, and is smaller in capacity than a print data amount for printing by scanning the printhead by a width scannable by the scanning means; block management means for dividing the buffer into a plurality of blocks corresponding to rectangular regions printed by scanning, and managing a use order of the blocks so as to circularly store print data in the blocks along with progress of printing; and null data management means for, when print data representing non-driving of the printing elements successively exist in a predetermined amount, representing the predetermined amount of print data by specific control data without storing the predetermined amount of print data in the blocks.

More specifically, according to the present invention, in a printing apparatus which performs printing by scanning a printhead having printing elements arrayed in a predetermined direction on a printing medium in a direction crossing to the array direction on the basis of information transmitted from a host apparatus, stores print data transmitted from the host apparatus, and has a buffer smaller in capacity than a print data amount printed on the printing medium by one scanning of the printhead, the buffer is divided into a plurality of blocks corresponding to rectangular regions printed by scanning. The use order of the blocks is so managed as to circularly store print data in the blocks along with the progress of printing. When print data representing non-driving of the printing elements successively exist in a predetermined amount, the predetermined amount of print data is represented by specific control data without storing the predetermined amount of print data in the blocks.

In the printing apparatus having a memory smaller in capacity than a data amount printed by one main scanning as a buffer which stores print data transmitted from a host apparatus, the buffer is divided into a plurality of blocks in a size corresponding to printing parameters such as the number of printing elements used for scanning, the scanning count of each printing region, and a set printing mode. The blocks are circularly used along with the progress of printing. When printing is continuously executed and a predetermined number of print data representing non-driving of the printing elements successively exist, these data are represented by specific control data without storing them in blocks. This realizes efficient use of the blocks and buffer.

As a result, high-speed, high-quality printing can be achieved with a low-cost equipment having a memory smaller in capacity than a data amount printed by one main scanning.

Preferably, the size of the block can be set for each block.

More preferably, the size of the block and the number of blocks can be set for one scanning.

At least either of the size of the block and the number of blocks can be set for printing for one page or for one job.

At least either of the size of the block and the number of blocks can be set in accordance with at least either of the number of printing elements used for scanning and a scanning count of each printing region.

The printing apparatus may have a printing mode in which high-speed printing is performed, and a printing mode in which high-quality printing is performed, and at least either of a size of the block and the number of blocks can be set in accordance with which printing mode is selected.

At least either of the size of the block and the number of blocks may be determined in accordance with information transmitted from the host apparatus.

Preferably, the apparatus further comprises transmission means for transmitting, to the host apparatus, information on at least any one of a capacity of the buffer usable by the printing apparatus, the number of printing elements used for scanning, and a scanning count of each printing region.

The size in a direction crossing to a scanning direction of the block may be a multiple of a predetermined number or a multiple of power of a predetermined number.

Preferably, the apparatus further comprises scanning start means for starting scanning after storing print data in a predetermined number of blocks.

The printing apparatus may comprise a plurality of printheads in correspondence with a plurality of colors, and comprises the block management means and the null data management means in correspondence with each printhead.

The printhead may be an inkjet printhead which discharges ink to perform printing.

In that case, the printhead may discharge ink by using heat energy, and have a thermal transducer which generates heat energy to be applied to the ink.

Another object is achieved by, as another aspect of the present invention, a printer driver which is installed in a host apparatus connected to a printing apparatus described above, and transmits control information and print data to the printing apparatus, comprising: a program code for executing a step of transmitting, as the control information, information on at least either of a size of a block and the number of blocks in accordance with a print data amount corresponding to a predetermined region.

Still another object is achieved by, as still another aspect of the present invention, a buffer management method for a printing apparatus which performs printing by scanning a printhead having printing elements, arrayed in a predetermined direction, on a printing medium in a direction crossing to the array direction on the basis of information transmitted from a host apparatus, stores print data transmitted from the host apparatus, and has a buffer smaller in capacity than a print data amount printed on the printing medium by one scanning of the printhead, comprising: a block management step of dividing the buffer into a plurality of blocks corresponding to rectangular regions printed by scanning, and managing a use order of the blocks so as to circularly store print data in the blocks along with progress of printing; and a null data management step of, when print data representing non-driving of the printing elements successively exist in a predetermined amount, representing the predetermined amount of print data by specific control data without storing the predetermined amount of print data in the blocks.

Still another aspect of the present invention is a printer driver which is executed in a host apparatus that is connected to a printing apparatus for performing printing by scanning, in a main scanning direction crossing to a predetermined direction, a printhead having a plurality of printing elements arrayed in the predetermined direction, and transfers print data used for printing to the printing apparatus, wherein the printer driver controls to generate print data corresponding to one scanning of the printhead in the main scanning direction, and start transferring the print data to the printing apparatus after generating the print data corresponding to one scanning of the printhead.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

First Embodiment

Figure 2:
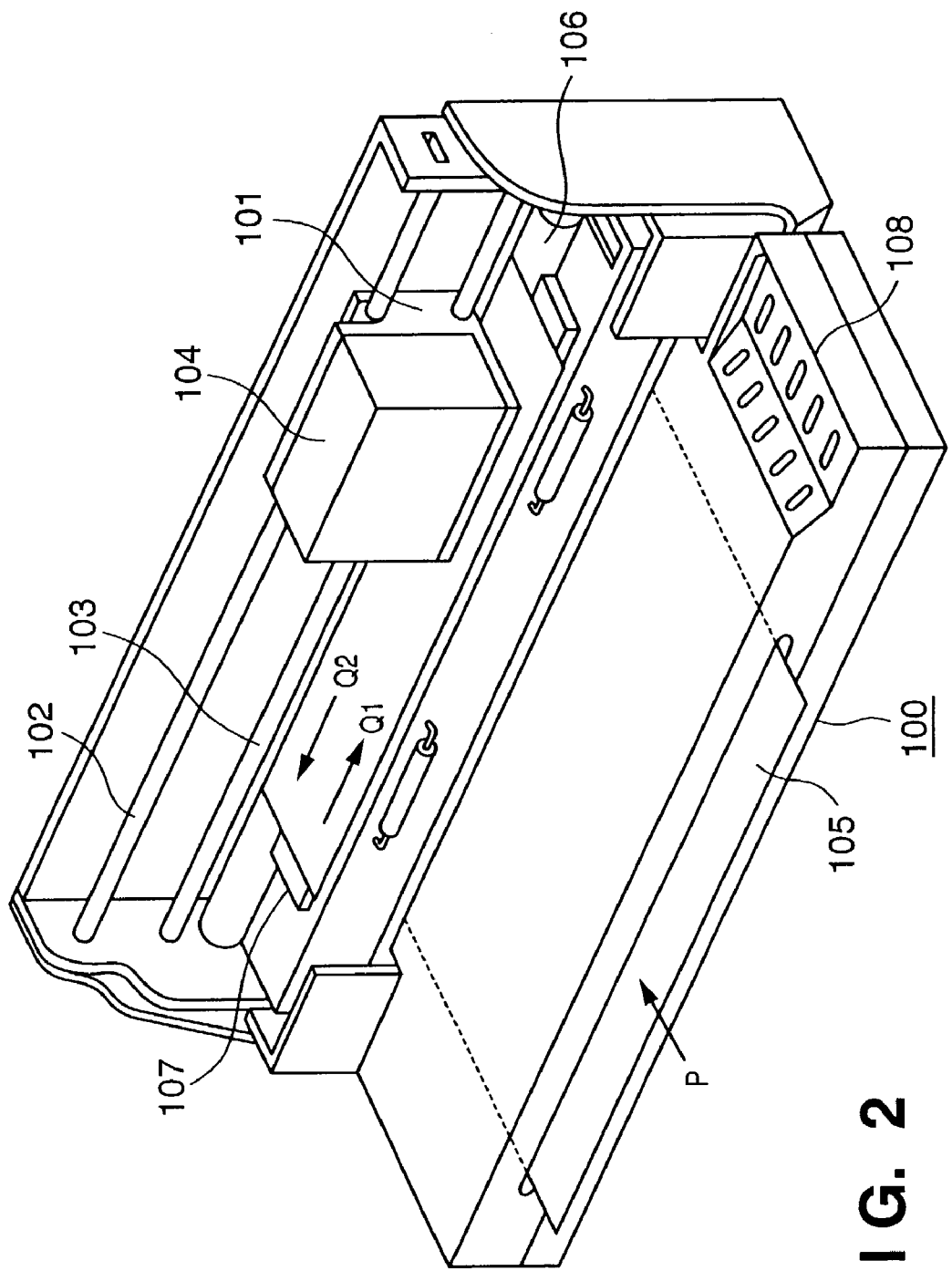
FIG. 2 is a perspective view showing the schematic arrangement of an inkjet printing apparatus according to the first embodiment of the present invention.

FIG. 2 is a perspective view showing the schematic arrangement of an inkjet printing apparatus according to the first embodiment of the present invention.

A printing medium 105 inserted into the sheet feed position of a printing apparatus 100 is fed by a feed roller 106 in a direction indicated by an arrow P, and conveyed to the printable region of a printhead 104. A platen 107 is arranged below the printing medium 105 in the printable region. A carriage 101 can be moved by two guide shafts 102 and 103 along them. The carriage 101 is reciprocally scanned by driving of a stepping motor (not shown) within a scanning region including a printing region in directions indicated by arrows Q1 and Q2 serving as a main scanning direction. After one main scanning ends, the printing medium is fed by a predetermined amount in the sub-scanning direction indicated by the arrow P, and waits for the next main scanning. Main scanning and sub-scanning are repeated to perform printing operation of one page. As for a printing width in the main scanning direction, a region where the printhead can be mechanically scanned is determined by the apparatus design. The maximum printing width is determined depending on the apparatus in correspondence with the scanning region. Printing can be done for a printing medium having a printing width determined by the scanning region of the printhead or a printing medium having a smaller printing width in the printing apparatus.

In FIG. 2, the printhead 104 mounted on the carriage 101 includes orifices capable of discharging ink, and an ink tank which contains ink. The printhead is mounted on the carriage such that printing is done by discharging ink from the orifice of the printhead to the printing medium below it. Reference numeral 108 denotes switches and a display unit. The switches are used to power on/off the printing apparatus or set various printing modes. The display can display various statuses of the printing apparatus.

The printhead 104 has orifices for Y (Yellow), M (Magenta), C (Cyan), and Bk (Black) so as to print data in the four colors. The number of orifices for each of Y, M, and C is 128, and the number of orifices for Bk is 320. The layout pitch between orifices for each color is 1/600 dpi in the sub-scanning direction, which corresponds to about 42 μm. The driving frequency of the printhead is 15 kHz, and the printhead can perform printing operation at a density of 600 dpi in the main scanning direction. The main scanning speed of the carriage in printing operation is 25 inch/sec.

Figure 8:
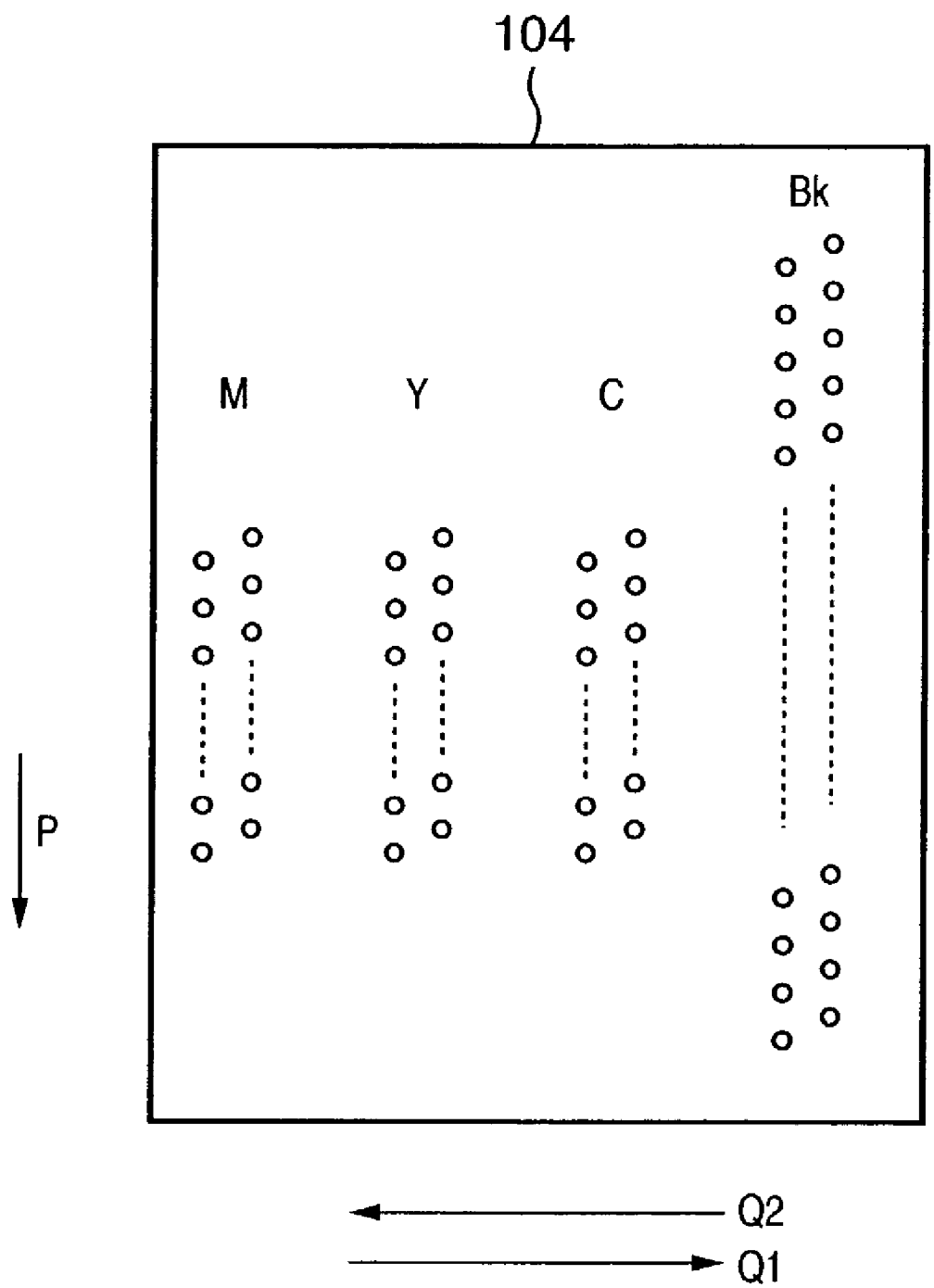
FIG. 8 is a view for explaining the orifice layout of a color printhead.

FIG. 8 is a view for explaining the orifice layout of the printhead 104. As shown in FIG. 8, orifices for each color are arrayed in two lines, and the layout pitch between the lines is 1/300 dpi. Arrows Q1 and Q2 indicate main scanning directions in which the printhead 104 moves. An arrow P indicates a sub-scanning direction in which the printing medium is moved relatively to the printhead.

Figure 3:
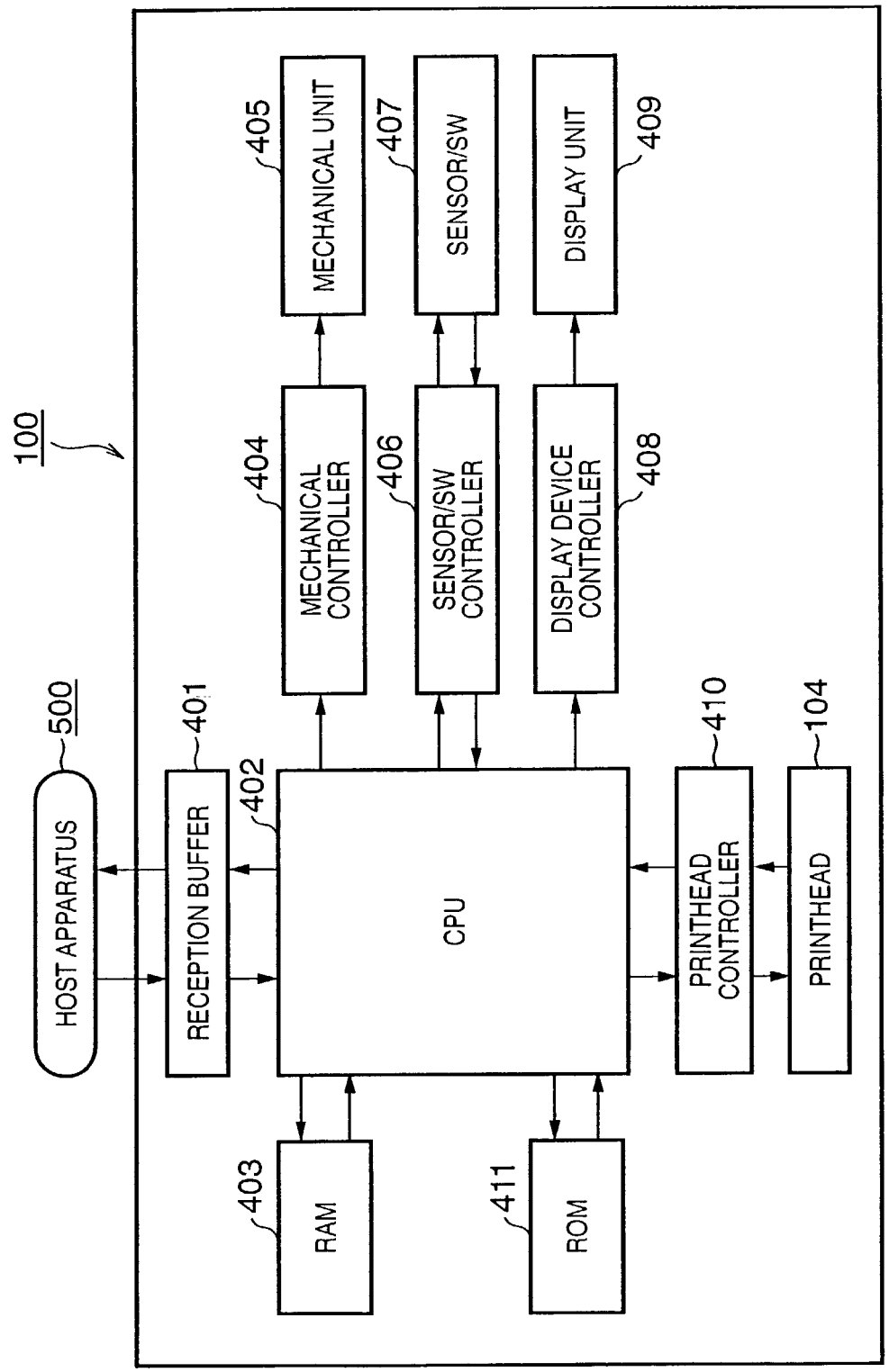
FIG. 3 is a block diagram showing the main control arrangement of the inkjet printing apparatus according to the first embodiment.

FIG. 3 is a block diagram showing the main control arrangement of the inkjet printing apparatus 100 according to the first embodiment. An external host apparatus 500 is connected to the printing apparatus 100. Character data and image data to be printed are transmitted from the host apparatus 500 to the printing apparatus 100, and accumulated in a reception buffer 401. Data for verifying whether print data is correctly transferred, and data representing the operation status of the printing apparatus 100 are transmitted from the printing apparatus 100 to the host apparatus 500.

Data accumulated in the reception buffer 401 is processed into data for printing in main scanning of the printhead 104 under the management of a CPU 402 which operates in accordance with a control program stored in a ROM 411. The resultant data is stored in a print buffer within a random access memory (RAM) 403. The print buffer stores data used for printing by the printhead. Data stored in the print buffer is transferred to the printhead, and then printing is executed. In the example shown in FIG. 3, an area for the print buffer is ensured in the memory area of the RAM 403. Data in the print buffer is transferred to the printhead 104 by a printhead controller 410. The printhead is controlled to print character data or image data. The printhead controller 410 detects temperature information or the like representing the state of the printhead 104, and sends the information to the CPU 402. The information is transmitted to the printhead controller 410 which controls driving of the printhead.

A mechanical controller 404 drives and controls a mechanical unit 405 such as a carriage motor or line feed motor in response to an instruction from the CPU 402.

A sensor/SW controller 406 transmits a signal to the CPU 402 from a sensor/SW 407 including various sensors and SW (switch).

A display device controller 408 controls a display unit 409 comprised of LEDs, liquid crystal display devices, and the like for display panels in response to an instruction from the CPU 402.

In the first embodiment, the capacity of the print buffer is smaller than a data amount printed by one main scanning of the printhead by a main scanning printing width determined by the apparatus. That is, a capacity smaller than a capacity necessary to store print data of one main scanning in correspondence with the maximum printing width of the apparatus is ensured in the RAM 403. This arrangement can reduce the memory capacity of the RAM 403 in the apparatus. A method of exploiting the print buffer in 1-pass color printing using 128 orifices for each of Y, M, C, and Bk out of the orifices of the printhead according to the first embodiment will be explained in detail.

Note that the print buffer capacity is smaller than a data amount corresponding to the maximum printing width of the printing apparatus and larger than ½. More specifically, for a maximum printing width of 8 inches, the data amount in printing at a density of 600 dpi is 4,800 dots in the scanning direction. The first embodiment decreases this data amount to 2,560 dots which is larger than ½. The conventional printing apparatus requires a memory for 4,800 dots, whereas the first embodiment ensures only about ½ the memory capacity.

A detailed arrangement of the print buffer is as follows.

A. Print buffers have the same size for Y, M, C, and Bk.

B. The print buffer is divided into rectangular blocks having a predetermined number of printing pixels (dots) in the vertical (sub-scanning) direction and horizontal (main scanning) direction. In the first embodiment, the block size is common to Y, M, C, and Bk. In the first embodiment, the block size is constant in one main scanning.

C. The vertical size (height) of the block can be changed by settings, and is an n1 multiple of 8 (n1 is a positive integer) in the first embodiment. For example, n1=16, and 8×n1=128. The merit of multiplying 8 by n1 is to achieve efficient calculation processing.

D. The horizontal size (width) of the block can be changed by settings, and is an n3 multiple of $2^{n2}$ (n2 and n3 are positive integers) in the first embodiment. For example, n2=8, n3=1, and $2^{n2}$×n3=256. Since the printing width is 256 (dots: pixels), the memory is divided into 2,560/256=10 blocks at maximum in the main scanning direction. The merit of multiplying $2^{n2}$ by n3 is to achieve efficient calculation processing.

E. No memory area is ensured for a block having no print data in each color. Instead, a zero flag is set, and data of this block is processed as null data in printing. The memory capacity can be more efficiently used. Alternatively, no memory is actually ensured by setting the block height or width to 0.

In this manner, the first embodiment facilitates memory management by giving the same size to print buffers for Y, M, C, and Bk and dividing each print buffer into rectangular blocks. The block has a changeable structure in which the vertical and horizontal sizes can be set every main scanning. The block can flexibly cope with printing conditions in order to efficiently use the memory.

Figure 1:
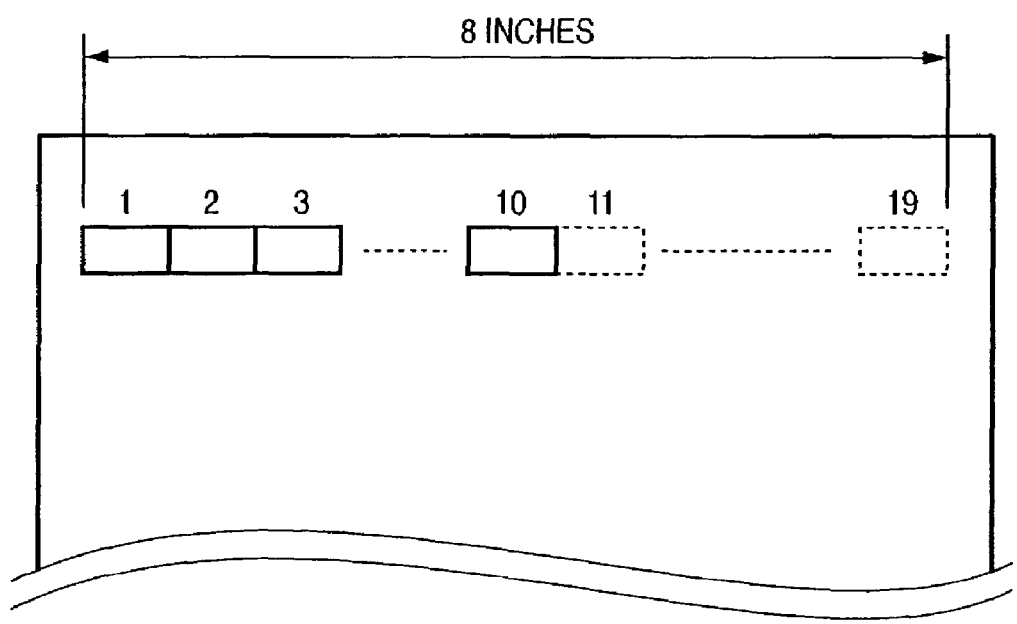
FIG. 1 is a view showing the concept of a print buffer set in the first embodiment of the present invention.

FIG. 1 is a view showing the concept of the block of the print buffer set in printing 8-inch wide data on an A4-size printing medium by one main scanning. In the first embodiment, the resolution in the main scanning direction is 600 dpi. Printing data at the entire width requires 19 blocks having a width of 256 dots. The first embodiment decreases the number of blocks to 10, saving the necessary memory capacity. Note that the vertical size of the block is 128 dots at 600 dpi, as described above.

Printing operation starts at the start of main scanning from left to right in FIG. 1. The number of blocks which can be used at the start is 10. After printing of block 1 ends, the block is used again as block 11. After printing of block 2 ends, the block is used again as block 12. Similarly, blocks having undergone printing are used again, and main scanning ends at the last block 19. In other words, of 10 blocks ensured as a print buffer, a block having undergone printing is used as a block corresponding to the next printing region. This enables printing corresponding to the entire printing width without ensuring a block region corresponding to the entire printing width.

In FIG. 1, a solid block represents a block which is ensured at the start of main scanning. A dotted block represents a block which is not ensured at the start of main scanning.

Figure 4:
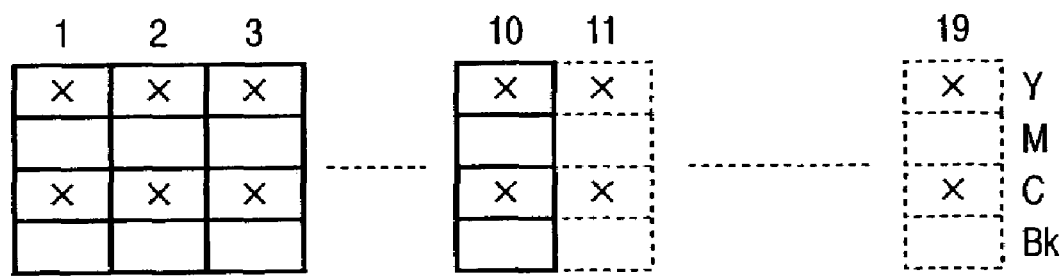
FIG. 4 is a block diagram showing blocks necessary for Y, M, C, and Bk in color printing according to the first embodiment, similar to FIG. 1.

FIG. 4 is a view showing blocks necessary for Y, M, C, and Bk in color printing according to the first embodiment, similar to FIG. 1. As described above, in the first embodiment, 128 orifices (nozzles) are used for each of the four colors in a color printing mode. Hence, blocks to be ensured for all the four colors are solid blocks, and the sum of the print buffer capacities is 128×256×10×4=1,310,720 (bits)

Figure 5:
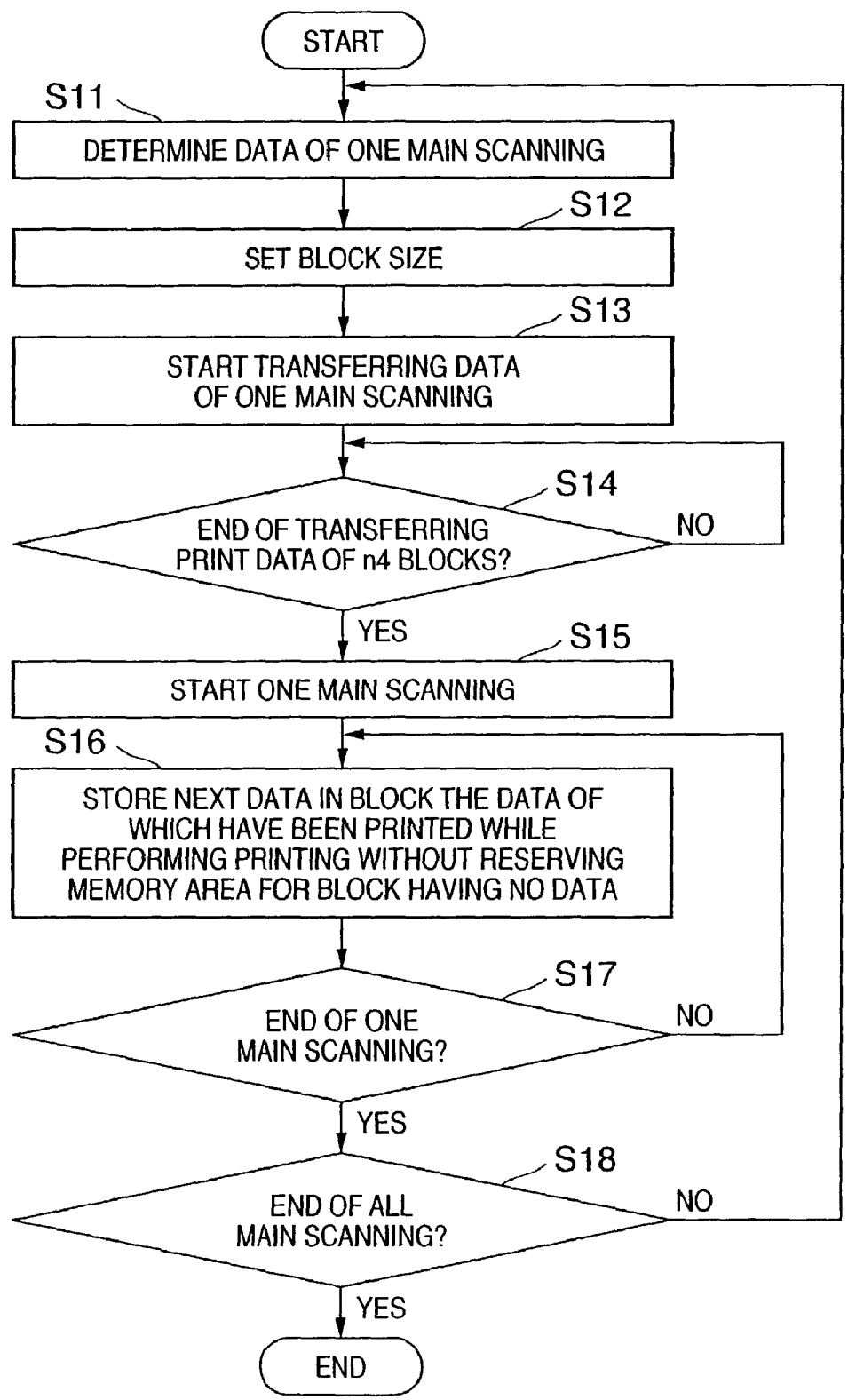
FIG. 5 is a flow chart showing operation of printing one page of an A4-size color image according to the first embodiment.

Operation of printing one page of an A4-size color image according to the first embodiment will be explained with reference to the flow chart shown in FIG. 5.

If the user designates printing on an application running in a host apparatus, the host apparatus determines print data corresponding to one main scanning (step S11).

More specifically, the host apparatus performs proper image processing for character data or image data to be printed, and creates print data representing as binary data whether to discharge ink droplets for all Y, M, C, and Bk colors. The host apparatus extracts print data corresponding to one main scanning from the created print data, and determines print data of one main scanning. In this way, according to the first embodiment, most of data processing is performed by the host apparatus. The processing load on the printing apparatus can be reduced, and the ROM capacity for storing control programs and the number of gates of an ASIC can be reduced. In the first embodiment, image processing executed in the host apparatus includes processes for image data such as color conversion processing, processing of extracting black data, gamma correction of correcting multilevel image data, and binarization processing which are generally image processes in the printing apparatus.

The host apparatus sets a block size, and transmits the information to the printing apparatus (step S12). The block size can be set in accordance with print data or the printing mode for each job, each page, each main scanning, or each block.

In this case, the printing mode is a 1-pass printing mode among a plurality of printing modes, and is changed for each job. The block size is changed for each page. As described above, the block size is common to Y, M, C, and Bk. The horizontal size is 256, the vertical size is 128, and the number of blocks is 10 for each color. A capacity corresponding to the block size and the number of blocks are ensured as a print buffer in the RAM 403 in advance.

Transfer of print data of one main scanning starts from the host apparatus to the printing apparatus (step S13). As for a block having no print data, no RAM area is ensured.

The printing apparatus determines whether print data have been transferred by the number n4 of printing start blocks where main scanning starts (step S14). In the first embodiment, n4=10, and n4 is a number equal to or smaller than the number of securable blocks that is obtained from the RAM capacity and block size of the printing apparatus. The number of printing start blocks may be, e.g., 9 for 10 ensured blocks. However, the number of printing start blocks is generally set to 10 which is equal to the number of ensured blocks, in order to maximize the margin for the data transfer rate.

If the number of blocks of print data transferred from the host apparatus is n4 or more, the printing apparatus moves the carriage, and starts printing operation by one main scanning (step S15). At this time, data of blocks which are not ensured are determined to have no print data, and null data representing no printing are transferred to the printhead.

If printing of one block ends, the printing apparatus stores the next print data in the block the data of which have been printed (step S16).

Whether one main scanning has ended is determined (step S17). If one main scanning has not ended, processing in step S16 is repeated.

If one main scanning has ended, whether all printing of one page has ended is determined (step S18). If printing has not ended, sub-scanning is done, and then the processing returns to step S11 to repeat the subsequent processing. In the first embodiment, the block size is set for each page, processing in step S12 is not performed in the second and subsequent scanning operations.

Whether one main scanning is correctly performed is roughly verified from the print buffer capacity, the printing speed, and the data transfer rate. As described above, in the first embodiment, the printing speed is determined by a carriage moving speed of 25 i/s and a printhead driving frequency of 15 kHz. A data amount insufficient for one main scanning at the start of main scanning with respect to a printing width of 8 inches is 128×256×(19−10)×4=1,179,648 (bits)

Assuming that the carriage acceleration time is 0.1 sec, the time taken to print blocks from block 1 to block 10 is 0.1+256×10/15,000=0.27 (sec)

If data are transferred from the host apparatus to the printing apparatus at the following transfer rate or more until block 10 is printed, all the remaining print data are transferred during printing operation, and printing by main scanning is correctly performed. The necessary transfer rate is $$1,179,648 / 0.27 = 4.37 \text{(Mbits/sec)}$$
$$= 547 \text{(Kbytes/sec)}$$

In practice, print data of the next block suffices to be transferred before printing of the current block ends even while block 11 and subsequent blocks are printed. The transfer rate can be lower than this value. In general, transferred print data is compressed, which generates a margin. The data transfer rate of a recent I/F such as USB or IEEE 1284 is higher than the necessary transfer rate. No interruption of print data generally occurs during main scanning (transfer does not catch up with printing).

In the first embodiment, if print data is interrupted during main scanning, main scanning of the same region is executed again, and printing of only a block failing in transfer is performed to complement the block.

To prevent interruption of print data, it is important to start scanning the carriage after data up to blocks (n4 blocks) corresponding to specific printing positions are transferred in step S14. In the first embodiment, the value n4 is 10 which is the maximum number of securable blocks. This arrangement can prevent a situation in which transfer of data to be printed next does not catch up with the completion of printing by one scanning.

As described above, in the first embodiment, no memory area is ensured for a block containing no data in each color. Instead, the next block is ensured.

For example, in main scanning of performing printing using only two colors of M and Bk out of Y, M, C, and Bk, as shown in FIG. 4, no memory need be ensured for block 1 to block 10 for Y and C that are represented by X in FIG. 4. Instead, block 11 to block 19, and two blocks for the next main scanning can be ensured for M and Bk. Substantially double the print buffer is ensured, and the memory can be effectively used.

More than 10 blocks as the minimum number of blocks can be substantially used in the print buffer. This provides a merit of utilizing the print buffer for a preceding portion in the same scanning or as a print buffer for the next main scanning.

The use of the print buffer for a preceding portion in the same scanning substantially increases the buffer amount ensured every main scanning in advance. For example, even if the data transfer rate from the host apparatus to the printing apparatus excessively decreases during main scanning under the influence of another task in multitask processing by the Windows system, a situation in which transfer of print data does not catch up with scanning and printing fails can be prevented.

In the example of FIG. 4, only two colors of magenta M and black Bk are used. Areas for generally storing data of cyan C and yellow Y are used to store data of M and Bk. The print buffer capacity substantially becomes larger than a data amount printed by one scanning. For example, scanning can start after all print data of one scanning are transferred for n4=19 in step S14.

When a print buffer for the next main scanning can be ensured, and the time necessary for data determination and data transfer in the host apparatus is shorter than the printing time, the data transfer standby time in step S14 after the end of main scanning until the start of the next main scanning can be shortened.

If the host apparatus starts data transfer before determining print data corresponding to one main scanning, and the printing time is shorter than the sum of the data determination time and data transfer time, transfer of print data may not catch up with carriage operation during main scanning.

To prevent this, according to the first embodiment, transfer of print data starts from the host apparatus to the printing apparatus after the host apparatus determines print data of at least one main scanning in step S11.

Second Embodiment

The second embodiment of the present invention will be described below. The second embodiment also concerns an inkjet printing apparatus identical to that in the first embodiment. In the following description, a description of the same parts as those in the first embodiment will be omitted, and the characteristic features of the second embodiment will be mainly explained.

In the first embodiment, main scanning data to be printed is divided into blocks, and no memory area is ensured for a block having no print data in each color. In the second embodiment, each block is further divided into subblocks, and the subblocks are managed, more effectively using the memory.

More specifically, each block is divided into subblock units by eight pixels in the vertical direction and the same unit as the block width in the horizontal direction. The presence/absence of print data is determined for each subblock unit. For a subblock unit having no data, no memory area is ensured, a zero flag is set, and data of this subblock unit is processed as null data in printing, more efficiently using the memory capacity. That is, in the second embodiment, the size changes between blocks.

Figure 6:
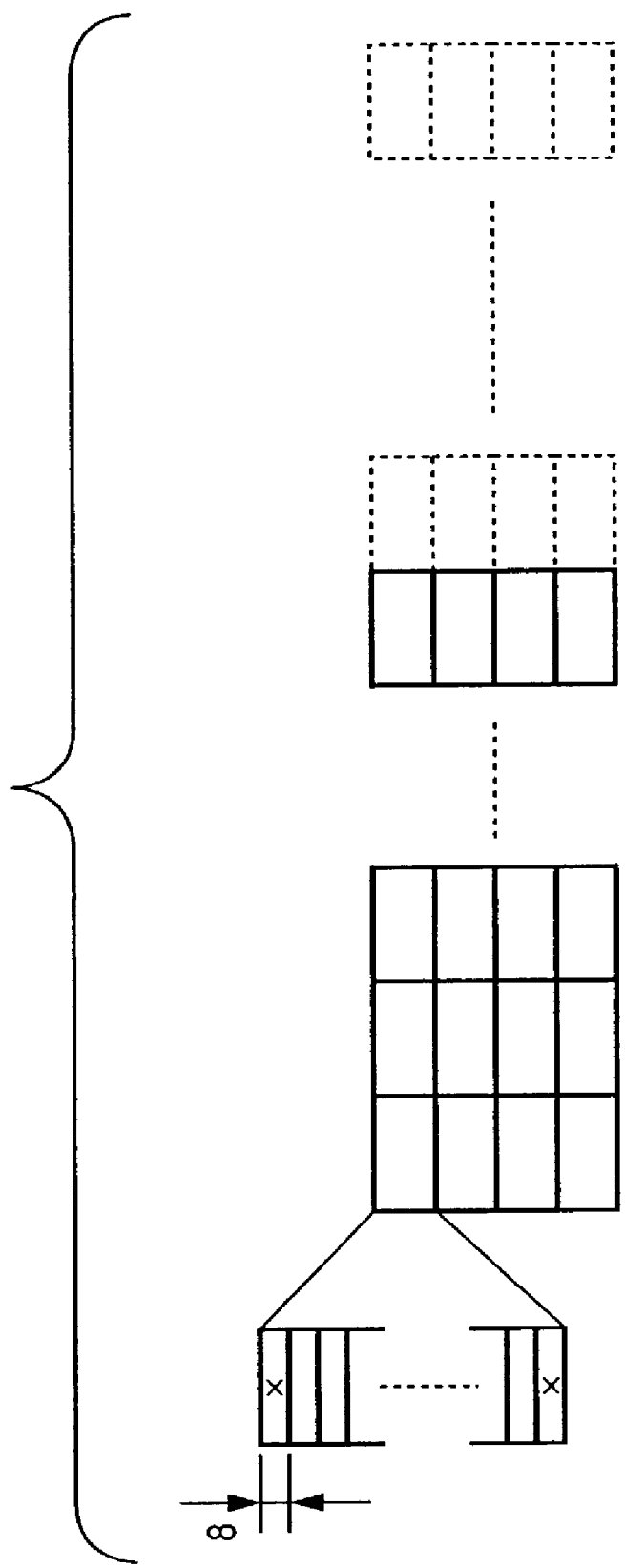
FIG. 6 is a view showing an example of a subblock unit according to the second embodiment.

FIG. 6 is a view showing an example of the subblock unit according to the second embodiment. FIG. 6 shows only enlarged Y block 1. This also applies to other blocks. In the example shown in FIG. 6, no data to be printed exists in the first and final subblock units.

This arrangement is applied to each block. Print data are vertically searched from the top in units corresponding to subblock units in each block. The position of the first subblock unit where print data exists and the position of the final subblock unit where print data exists are obtained. A size corresponding to a region including these subblock units is ensured as a memory area for the block.

The size of each block is equal to the size in the first embodiment at maximum. In the presence of a portion (subblock unit) having no print data, the size of each block becomes smaller than the size in the first embodiment. Even with the same print buffer size, the number of ensured blocks may be larger than that in the first embodiment. Even at the same transfer rate from the host apparatus to the printing apparatus, the second embodiment can cope with higher-speed printing than the first embodiment.

In this fashion, the second embodiment manages only two points: a data access start point (the position of the first subblock unit where print data exists), and a data access end point (the position of the final subblock unit where print data exists). While the memory amount ensured in accordance with an actual print data amount contained in each block is saved, processing can be performed within a short time, coping with high-speed printing.

Third Embodiment

The third embodiment of the present invention will be described below. The third embodiment also concerns an inkjet printing apparatus identical to those in the above embodiments. In the following description, a description of the same parts as those in the above embodiments will be omitted, and the characteristic features of the third embodiment will be mainly explained.

In the first embodiment, main scanning data is divided into successive blocks from the start position of the printing region. In the third embodiment, the start position of each block is set to the first position where data to be printed exists in the scanning direction so as to assign a block to only a portion where print data exists.

If regions having no data successively exist from the start position of the printing region or the break of a block, no data need be ensured for these regions, and the memory can be more efficiently exploited.

To simplify processing, block start positions are set common to Y, M, C, and Bk. To more efficiently use the memory, block start positions are independently set for respective colors.

Figure 7:
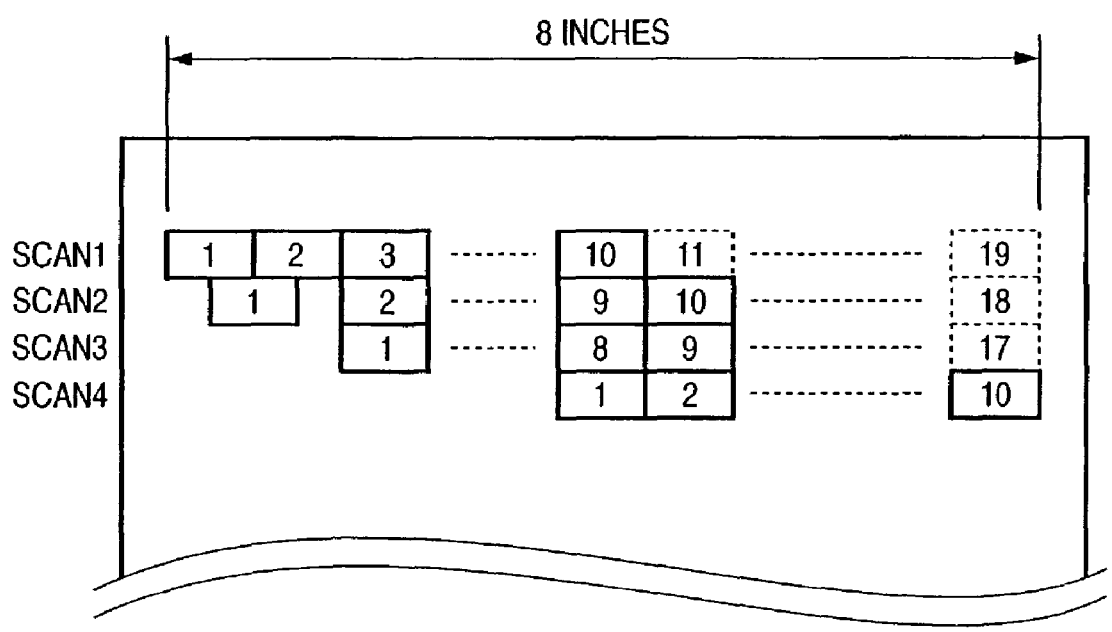
FIG. 7 is a view showing an example of block assignment to print data present with various patterns in the main scanning direction according to the third embodiment.

FIG. 7 is a view showing an example of block assignment to print data present with various patterns in the main scanning direction according to the third embodiment.

Assume that the printhead is scanned from left to right in FIG. 7, the printing width is 8 inches, and the block size is the same as that in the first embodiment. FIG. 7 illustrates only blocks for one printhead. SCAN 1 to SCAN 4 represent the first to fourth main scanning operations.

In SCAN 1, print data successively exist. Similar to blocks in the first embodiment, 19 blocks are assigned to main scanning.

In SCAN 2, regions having no print data exist at the start and middle of the printing region. No print data exists up to a position corresponding to ½ a block from the start of the printing region. The start position of block 1 is located apart from the start of the printing region by a distance corresponding to ½ the block. A memory corresponding to ½ the block is saved. After data of block 1, no print data exists up to a position corresponding to ½ a block. The start position of block 2 is located apart from the end position of block 1 by a distance corresponding to ½ the block. A memory corresponding to ½ the block is saved. In the subsequent region, data successively exist, and a total of 18 blocks are assigned to main scanning. A memory used for main scanning SCAN 2 is saved by a total of one block.

In SCAN 3, a region having no print data exists at the start of the printing region. No print data exists up to a position corresponding to two blocks from the start of the printing region. The start position of block 1 is located apart from the start of the printing region by a distance corresponding to the two blocks. A memory corresponding to the two blocks is saved. In the subsequent region, data successively exist, and a total of 17 blocks are assigned to main scanning. A memory used for main scanning SCAN 3 is therefore saved by a total of two blocks.

In SCAN 4, a region having no print data exists at the start of the printing region. No print data exists up to a position corresponding to nine blocks from the start of the printing region. The start position of block 1 is located apart from the start of the printing region by a distance corresponding to the nine blocks. A memory corresponding to the nine blocks is saved. In the subsequent region, data successively exist, and a total of 10 blocks are assigned to main scanning. A memory used for main scanning SCAN 4 is saved by a total of nine blocks. All print data corresponding to one main scanning are stored in the print buffer.

According to the third embodiment, block 1 is assigned to a position where print data first exists from the start of the printing region. Block 2 is assigned to a position where print data first exists after block 1. A block start position is set to a position where print data exists. If regions having no print data successively exist in the main scanning direction, the number of blocks assigned to one main scanning can be decreased, efficiently using the memory.

One printhead (color) has been described. The above processing is executed independently for printheads for the respective colors, more efficiently using the memory.

Fourth Embodiment

The fourth embodiment of the present invention will be described below. The fourth embodiment also concerns an inkjet printing apparatus identical to those in the above embodiments. In the following description, a description of the same parts as those in the above embodiments will be omitted, and the characteristic features of the fourth embodiment will be mainly explained.

In the first embodiment, the block size is fixed within one main scanning. In the fourth embodiment, the size can be set for each block.

For example, printing at a printing width of 8 inches and a resolution of 600 dpi corresponds to a total of 4,800 dots. If 19 blocks are used at a block width (scanning direction length) of 256 dots, like the first embodiment, a total of 4,864 dots are obtained. A memory of 64 dots is not used and is wasted.

To eliminate such wasteful use, only the final block in one main scanning is designed to a width of 192 dots. This can minimize the memory amount to be ensured.

As another example, when no data exists from the middle of the 8-inch printing width, the width of the final block where print data exists may be set small. These processes may be executed commonly to all the colors or independently of the respective colors.

Fifth Embodiment

The fifth embodiment of the present invention will be described below. The fifth embodiment also concerns an inkjet printing apparatus identical to those in the above embodiments. In the following description, a description of the same parts as those in the above embodiments will be omitted, and the characteristic features of the fifth embodiment will be mainly explained.

The above embodiments assume 1-pass printing. The fifth embodiment assumes a plurality of printing modes using different numbers of nozzles and different numbers of passes used in the printhead. The block size is changed in correspondence with each printing mode.

For example, the printing apparatus has two printing modes, e.g., a 1-pass mode and 4-pass mode using different numbers of passes. The block width is set to 256 dots for the 1-pass mode in which priority is given to high-speed printing of a relatively simple image such as a text or graph. The block width is set to 128 dots for the 4-pass mode in which priority is given not to the speed but to high-quality printing of a relatively complicated image such as a photographic image.

More specifically, in the 1-pass mode, the size is set large in order to minimize the CPU access count concerning block processing. In the 4-pass mode, print data is finely managed to increase a savable memory.

The printing modes may include two printing modes using different numbers of nozzles of a printhead used, e.g., a high-speed mode using 128 nozzles and a high-quality mode using 64 nozzles, and priority is given to either the printing speed or printing quality. In the high-quality mode, the number of nozzles used for one scanning is generally decreased to reduce band nonuniformity every main scanning.

In this case, the print buffer ensures 10 blocks at a size of a 256-dot width×128-dot height in the high-speed mode, and 40 blocks at a size of a 128-dot width×64-dot height in the high-quality mode. In the high-speed mode, the print data amount stored in the print buffer is smaller than a data amount printed by one main scanning. In the high-quality mode, data larger than a data amount printed by one main scanning can be stored in the print buffer.

According to the fifth embodiment, the block size is set in accordance with printing modes which are different in the number of nozzles and the number of passes used in the printhead. The memory can be more efficiently used.

The block size may be changed for each job. For example, the block size is kept constant for all pages in a job for successively printing, e.g., 10 pages. This can eliminate block setting processing between pages.

Alternatively, the block size may be changed for each page. For example, the printer driver of the host apparatus obtains in advance the number of print data within one page. The block size is decreased for a large number of print data and increased for a small number of print data.

Sixth Embodiment

The sixth embodiment of the present invention will be described below. The sixth embodiment also concerns an inkjet printing apparatus identical to those in the above embodiments. In the following description, a description of the same parts as those in the above embodiments will be omitted, and the characteristic features of the sixth embodiment will be mainly explained.

In the above embodiments, the print buffer capacity is constant. In the sixth embodiment, the host apparatus confirms the capacity of a RAM 403 of a printing apparatus or a capacity usable as a print buffer. Block parameters such as the block size, the number of blocks, and the number of printing start blocks are determined in accordance with printing parameters such as the number of nozzles of a printhead used, print data, and the printing mode.

For example, the first embodiment assumes a print buffer capacity of 1,310,720 bits. In practice, the capacity of the RAM 403 of the printing apparatus or a capacity securable as a print buffer changes depending on the printing apparatus. In the sixth embodiment, the host recognizes a capacity securable as a print buffer through communication between the host apparatus and the printing apparatus. Block parameters such as the block size, the number of blocks, and the number of printing start blocks are determined in accordance with printing parameters such as the number of nozzles of a printhead used, print data, and the printing mode.

For example, if the capacity securable as a print buffer is 1,310,720 bits×1.5 and the number of printing start blocks is changed from 10 to 15 with the remaining settings kept unchanged, the occurrence frequency of printing interruption due to the delay of data transfer further decreases.

In a monochrome mode in which the capacity securable as a print buffer is 1,310,720 bits and printing is done in only Bk ink using all 320 orifices of the Bk head, the number of blocks is 16 at a block size of a 256-dot width×a 320-dot height.

In printing while switching between the color mode and the monochrome mode for each page, the block size and the number of blocks are switched for each page. Whether to use only the Bk head or all printheads may be switched for each main scanning depending on whether print data are only Bk data, and block assignment is changed in accordance with the switching result.

These settings are realized by determining, by the host apparatus, block parameters such as the block size, the number of blocks, and the number of printing start blocks in accordance with the number of nozzles of the printhead, print data, and the printing mode and transferring the block parameters to the printing apparatus after the printer driver of the host apparatus determines pages and main scanning print data.

According to the sixth embodiment, block parameters can be flexibly set in accordance with print data for each block, each main scanning, each page, or each job. The memory can be more efficiently used.

Seventh Embodiment

The seventh embodiment of the present invention will be described below. The seventh embodiment also concerns an inkjet printing apparatus identical to those in the above embodiments. In the following description, a description of the same parts as those in the above embodiments will be omitted, and the characteristic features of the seventh embodiment will be mainly explained.

In the above embodiments, a block parameter, particularly the block size has been described by mainly exemplifying a case wherein the setting of a height corresponding to the number of nozzles is changed. In the seventh embodiment, the width of the block size in the main scanning direction can be changed.

To more efficiently use the memory, the block size, particularly the width is desirably minimized. A large block width prolongs the transfer time of data for one block, and a long time is taken to transfer data up to printing start blocks where main scanning starts. To shorten the time until the start of main scanning, it is effective to reduce the block width.

The block width is preferably set by the printer driver of the host apparatus in accordance with the width of the printing region in main scanning. More specifically, the block width is set small for a small printing region width and large for a large printing region width.

As another merit obtained by this processing, recovery positions (connection positions) in the main scanning direction for a small printing region width are finely distributed in recovery processing when print data is interrupted. To the contrary, for a large block width, recovery positions are set to the same position in the main scanning direction at a high probability.

The printing region width may be detected on the basis of the size of a printing medium used. For example, when the printing medium used, such as a postcard, is much smaller than a general A4 sheet, the block width may be set small for a job using the printing medium.

Similar to other block parameters, the block width may be flexibly set in accordance with print data for each main scanning, each page, or each job.

Other Embodiment

The above-described embodiments may be practiced singly or in a proper combination of them.

The above-described embodiments have exemplified an inkjet printing apparatus. The present invention can also be applied to a printing apparatus using another printing method except the inkjet printing method as far as the printing apparatus is a serial printing apparatus which performs printing by scanning a printhead on a printing medium.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments being realized by executing the program codes which are read by a computer, the present invention also includes a case where an OS (operating system) or the like working on the computer performs parts or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or entire process in accordance with designations of the program codes and realizes functions of the above embodiments.

If the present invention is realized as a storage medium, program codes corresponding to the above mentioned flowchart (FIG. 5) is to be stored in the storage medium.

As is apparent, many different embodiments of the present invention can be made without departing from the spirit and scope thereof, so it is to be understood that the invention is not limited to the specific embodiments thereof except as defined in the appended claims.

What is claimed is:

1. A printing apparatus which performs printing on a printing medium on the basis of print data transmitted from a host apparatus by using a printhead in which a plurality of printing elements are arrayed in a predetermined direction, comprising:

scanning means for scanning the printhead in a main scanning direction crossing to the predetermined direction;

a buffer which stores the print data transmitted from the host apparatus in order to transfer the print data to the printhead, and is smaller in capacity than a print data amount for printing by scanning the printhead by a width scannable by said scanning means;

block management means for dividing said buffer into a plurality of blocks corresponding to rectangular regions printed by scanning, managing a use order of the blocks so as to circularly store print data in the blocks along with progress of printing, and further managing print data input to said buffer and print data output from said buffer such that print data to be printed during a single scanning is stored in each block of said buffer and the print data stored in each block of said buffer is transmitted to the printhead; and null data management means for, when print data representing non-driving of the printing elements successively exist in a predetermined amount, representing the predetermined amount of print data by specific control data without storing the predetermined amount of print data in the blocks.

2. The apparatus according to claim 1, wherein a size of the block can be set for each block.

3. The apparatus according to claim 1, wherein at least either of a size of the block and the number of blocks can be set for one scanning.

4. The apparatus according to claim 1, wherein at least either of a size of the block and the number of blocks can be set for printing for one page.

5. The apparatus according to claim 1, wherein at least either of a size of the block and the number of blocks can be set for one job.

6. The apparatus according to claim 1, wherein at least either of a size of the block and the number of blocks can be set in accordance with at least either of the number of printing elements used for scanning and a scanning count of each printing region.

7. The apparatus according to claim 1, wherein the printing apparatus has a printing mode in which high-speed printing is performed, and a printing mode in which high-quality printing is performed, and at least either of a size of the block and the number of blocks can be set in accordance with which printing mode is selected.

8. The apparatus according to claim 1, wherein at least either of a size of the block and the number of blocks is determined in accordance with information transmitted from the host apparatus.

9. The apparatus according to claim 8, further comprising transmission means for transmitting, to the host apparatus, information on at least any one of a capacity of said buffer usable by the printing apparatus, the number of printing elements used for scanning, and a scanning count of each printing region.

10. The apparatus according to claim 1, wherein a size in a direction crossing to a scanning direction of the block is a multiple of a predetermined number.

11. The apparatus according to claim 1, wherein a size in a scanning direction of the block is a multiple of power of a predetermined number.

12. The apparatus according to claim 1, further comprising scanning start means for starting scanning after storing print data in a predetermined number of blocks.

13. The apparatus according to claim 1, wherein the printing apparatus comprises a plurality of printheads in correspondence with a plurality of colors, and comprises said block management means and said null data management means in correspondence with each printhead.

14. The apparatus according to claim 1, wherein the printhead is an inkjet printhead which discharges ink to perform printing.

15. The apparatus according to claim 14, wherein the printhead is a printhead which discharges ink by using heat energy, and has a thermal transducer which generates heat energy to be applied to the ink.

16. A buffer management method for a printing apparatus which performs printing by scanning a printhead having printing elements, arrayed in a predetermined direction, on a printing medium in a direction crossing to the away direction on the basis of information transmitted from a host apparatus, stores print data transmitted from the host apparatus, and has a buffer smaller in capacity than a print data amount printed on the printing medium by one scanning of the printhead, comprising:

a block management step of dividing the buffer into a plurality of blocks corresponding to rectangular regions printed by scanning, managing a use order of the blocks so as to circularly store print data in the blocks along with progress of printing, and further managing print data input to the buffer and print data output from the buffer such that print data to be printed during a single scanning is stored in each block of the buffer and the print data stored in each block of the buffer is transmitted to the printhead; and a null data management step of, when print data representing non-driving of the printing elements successively exist in a predetermined amount, representing the predetermined amount of print data by specific control data without storing the predetermined amount of print data in the blocks.

* * * * *

UNITED STATES PATENT AND TRADEMARK OFFICE
CERTIFICATE OF CORRECTION

| | | |
|---|---|---|
| PATENT NO. | : 7,405,839 B2 | Page 1 of 1 |
| APPLICATION NO. | : 10/413374 | |
| DATED | : July 29, 2008 | |
| INVENTOR(S) | : Jiro Moriyama et al. | |

It is certified that error appears in the above-identified patent and that said Letters Patent is hereby corrected as shown below:

ON COVER PAGE [56] FOREIGN PATENT DOCUMENTS:

Foreign Patent Documents, "JP   2000127522   5/2000" should be deleted.

ON COVER PAGE [56] FOREIGN PATENT DOCUMENTS:

Foreign Patent Documents, "2000127522" should read --2000-127522   A   *--.

ON COVER PAGE [56] FOREIGN PATENT DOCUMENTS:

Foreign Patent Documents, (insert) --JP   64-21528   1/1989--.

COLUMN 1:

Line 24, "of low" should read --low--; and
Line 54, "does not" should read --is not performed--.

Signed and Sealed this

Sixteenth Day of December, 2008

JON W. DUDAS
*Director of the United States Patent and Trademark Office*